Figure 1:
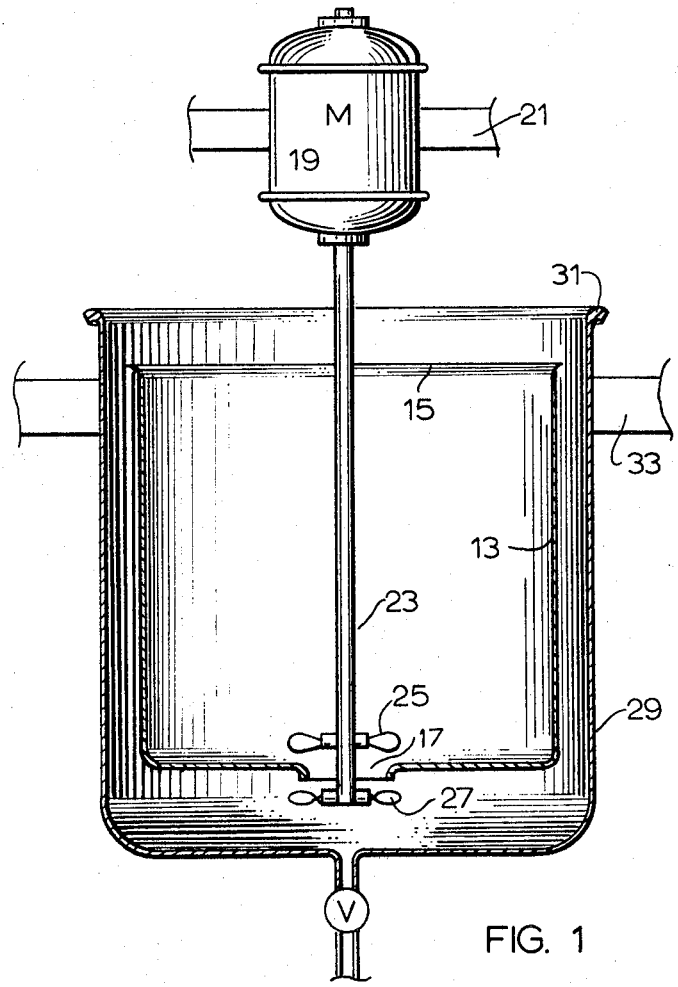

June 4, 1968     P. W. HUDSON     3,386,818
USE OF HYDROMIXER FOR THE RECOVERY OF SUBSTANTIALLY
IMPURITY-FREE COPPER POWDER FROM LEACHED
MALACHITE AND AZURITE COPPER POWDER
Filed Aug. 23, 1965     2 Sheets-Sheet 1

PERCY W. HUDSON
INVENTOR.

BY

ATTORNEY

June 4, 1968 P. W. HUDSON 3,386,818
USE OF HYDROMIXER FOR THE RECOVERY OF SUBSTANTIALLY
IMPURITY-FREE COPPER POWDER FROM LEACHED
MALACHITE AND AZURITE COPPER POWDER
Filed Aug. 23, 1965 2 Sheets-Sheet 2

PERCY W. HUDSON
*INVENTOR.*

BY

ATTORNEY

United States Patent Office 3,386,818
Patented June 4, 1968

3,386,818
USE OF HYDROMIXER FOR THE RECOVERY OF SUBSTANTIALLY IMPURITY-FREE COPPER POWDER FROM LEACHED MALACHITE AND AZURITE COPPER POWDER
Percy W. Hudson, 305 Main St., Old Saybrook, Conn. 06475
Filed Aug. 23, 1965, Ser. No. 481,647
1 Claim. (Cl. 75—117)

The present invention relates to the production of copper powder in excess of 99.5% copper from copper powders obtained from leaching malachite and azurite containing sandstone.

The procedure followed in producing pure copper depends on the copper-containing raw material from which copper is obtained. For example, in the article on copper in Kirk-Othmer's "Encyclopedia of Chemical Technology," vol. 4, pages 396, 397, examples are given to show that most ores mined in the United States contain less than 2% Cu. The Utah Copper Co. mines an ore containing about 0.9% Cu. Some of the copper mined in Utah is malachite, $CuCO_3 \cdot Cu(OH)_2$, and azurite, $$2CuCO_3 \cdot Cu(OH)_2$$

In one process, sulfuric acid is used as a leach liquor to dissolve the copper ore from sandstone. This produces a mother liquor pregnant with Cu and sulfuric acid in the form of a sulfate. For reasons known in the art, the sulfate causes procedural difficulties. Sodium chloride is added so as to produce HCl. At this stage, aluminum powder is added. Because of the electrical potential difference between Al and Cu, the Al replaces the Cu which precipitates as an agglomerate floc and settles to the bottom of the tank. The reduction is finished with bar aluminum. The spent solution is decanted, water is then added and the copper is washed. This copper although obtainable in purities of upwards of 98% still has the small percentages of chlorides in it as impurities. For electrical applications, Cu of a purity of upwards of 99.5% is desired. Thus, the desirability is for what is known as O.F.H.C. copper (oxygen-free-high-conductivity copper) and, electrolytic copper which is 99.97% to 99.99% Cu. Although copper from malachite and azurite of some 98% Cu can be produced, the removal of the chlorides to obtain higher than 99.5% Cu has heretofore posed considerable difficulties. Although attempts may have been made to solve these difficulties to produce substantially impurity-free copper from malachite and azurite, none, as far as I am aware have ever been successful when carried out into actual practice.

The present invention is principally directed to the recovery of substantially impurity-free copper from the aforesaid ores.

Therefore, one object of the present invention is to provide for the production of substantially impurity-free copper from malachite and azurite.

Another object of the present invention is to provide for an apparatus to expose powders to washing liquids.

Still another object of the present invention is to provide for a method of washing powders in the presence of liquid, e.g., water.

Figure 2:
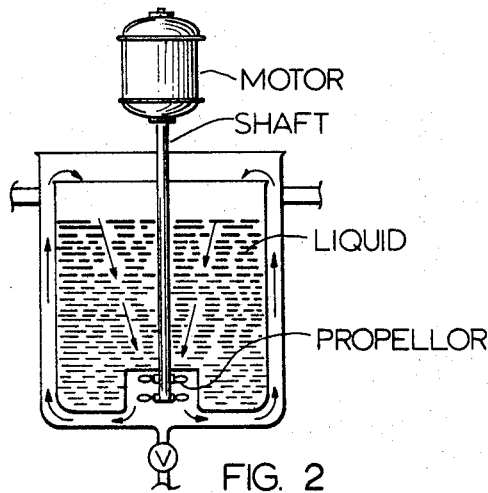
Figure 3:
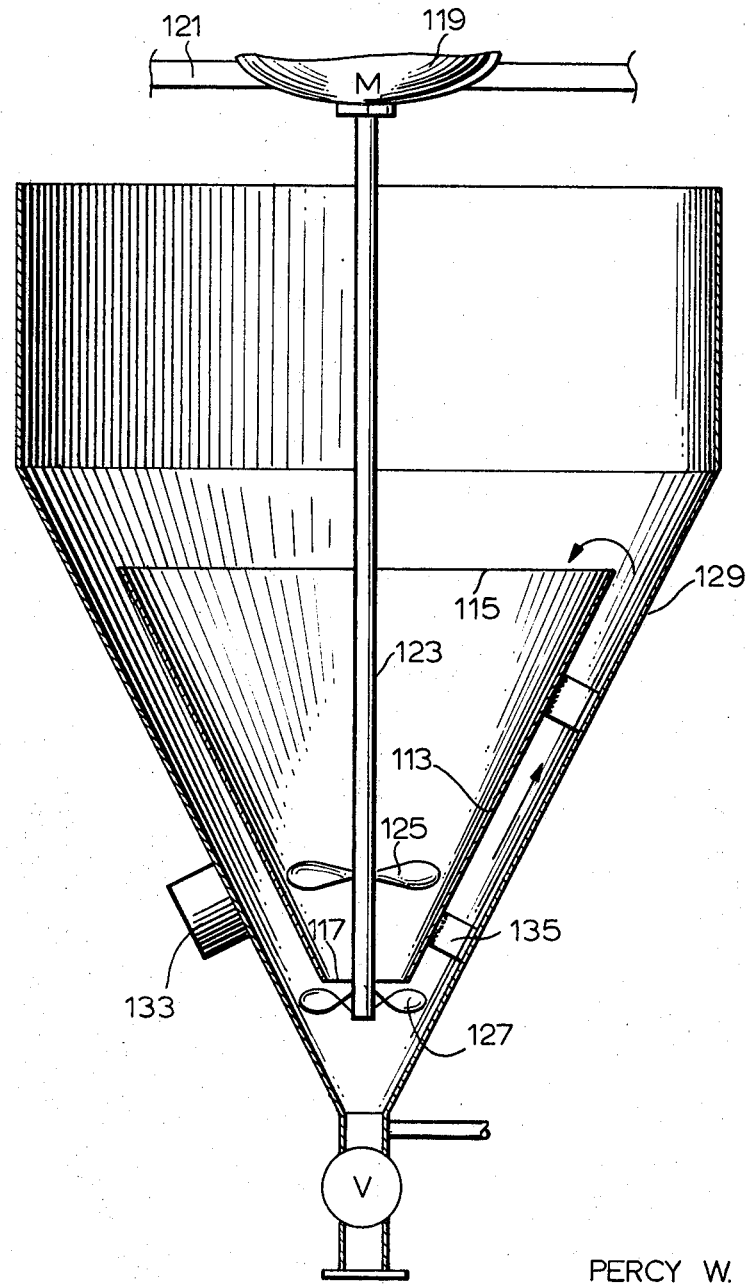

With the foregoing and other objects in view, the invention resides in the novel arrangement, combination of parts and process steps, and in the details of construction hereinafter described and claimed, it being understood that changes in the precise embodiment of the invention herein disclosed may be made within the scope of what is claimed without departing from the spirit of the invention. Other objects and advantages of the invention will become apparent from the following description taken in conjunction with the accompanying drawing in which:

FIGURE 1 shows a cross-sectional view of one embodiment of the invention;
FIGURE 2 depicts dynamically the embodiment of FIGURE 1 while in operation; and,
FIGURE 3 illustrates in cross-section a modified form of the invention shown in FIGURE 1.

Generally speaking, the invention contemplates exposing previously treated copper powder containing small amounts of chloride impurities to the action of water in an elongated first enclosed zone of curvilinear cross-section, having a large opening at the top and a small tubular aperture at the bottom, propelling the water and powder slurry through the bottom aperture into a second zone completely surrounding the first zone, the water and powder slurry rising to and over the top opening back into said first zone, and, recycling the slurry until the chlorides are dissolved in the water. The impurity containing powder is introduced into a first cylindrical or conical container with an open top and a small bottom tubular aperture. At least one propeller is disposed in the bottom aperture and turned by motor means. The first container is held suspended in a second container of like configuration, the two containers forming a narrow-walled jacket so that the powder and water slurry passing out of the bottom aperture rises along the jacket walls over the top of the first container and is recycled therein.

In the embodiment of FIGURES 1 and 2 powder and water 11 are introduced with an elongated first container 13 of cylindrical configuration. The top is open and at the bottom is a small tubular aperture 17. Over the container 13 is a motor held by holding means 21. The motor shaft 23 extends down into aperture 17 and has two propellers 25 and 27 the blades of which have the pitch reversed. Closely surrounding first container 13 is a second cylindrical container 29. The action taking place is better shown in FIGURE 2. The slurry is propelled through bottom tubular aperture 17, and, a strong vortex is induced into the slurry by the propeller blades. These propeller blades are centered in the vortex aperture which is of relatively small diameter in relation to the tank. Gradually, the suspension to be washed or mixed is pushed downwards through the turbine type blades and then dispersed through 360°. The velocity generated and the differential pressure causes the liquid to rise in the jacket and overflow over the edge of the inner or first container. The advantage as a mixer resides in the fact that all interfaces within the liquid are gradually exposed to one another, first within the vortex tube where extreme turbulence exists due to the propeller, and second, at the top circumference of the inner or first container where the incoming liquid surges over the edge around the entire perimeter. Due to the construction of the inner container, all the solutions must at some time flow towards and pass through the central vortex aperture and be subjected to the turbulence of the propeller blades and the high velocity of the liquid stream and the dispersal action under the jacket as the liquid flows out at 360°. As the liquid rises peripherally and the air circumferentially, a further intimate mixing occurs in the jacket annulus. By changing the distance between the two propellers, an effect similar to changing the pitch of the propeller blades is created so that the slurry velocity can be changed although the motor is a constant speed motor. It is important to properly position the blades in the tubular aperture to form a vortex. As the liquid is forced past the lower propeller blades and then sharply at right angles, a vortex is created directly behind both sets of blades enhancing the turbulance and mixing action.

The outer or second container 29 preferably has a second jacketed outer shell 31 which can be used for heat exchange purpose and can include a heating-cooling unit 33. The thin annular space of the inner jacket coupled with the high film slurry velocity has excellent thermal interchange properties. The scrubbing action enhances liquid contact by breaking down the film barrier.

In the second embodiment as shown in FIGURE 3, the slurry is treated in an inverted conical container 113 having an open top 115 and an apex aperture 117. Similar to the first embodiment, a motor 119 is held over the first container by holding means 121. The motor turns a shaft 123 having propellers 125 and 127 with blades of reverse pitch disposed above and below apex aperture 117 so as to propel the slurry therethrough. Around conical first container 113 is a second container 129. The angle of the conical slopes is so fixed as to be steeper than the angle of repose of the metallic granules treated. This prevents the formation of a matte at the bottom of the containers which unfortunately occurs in the first embodiment. Additionally, a mechanical vibrator 133 is used for this purpose. The first conical container 113 is held in the second conical container 129 by spacers 135. Preferably, the two containers in both embodiments are of stainless steel, e.g., 316 type stainless steel.

It is to be observed therefore, that the present invention provides for an improvement in the method of treating impurity containing copper powder by placing the powder with water in an elongated first zone having a large top opening and a small bottom aperture; propelling the powder and water slurry into a second zone through said aperture, said second zone closely surrounding said first zone so that said water and powder slurry rise over said first zone top opening and back into said first zone, recycling said slurry until the impurities are dissolved in the water.

Furthermore, the present invention provides for an apparatus for treating metal powders to remove impurities therefrom and comprises in combination, a first elongated curvilinear container 13, 113 with an opening at the top 15, 115 and a small bottom aperture 17, 117. Propeller blades 25, 27, 125, 127 are disposed in said aperture, the blades being preferably of reverse pitch. Surrounding the first container and of like configuration is a second container 29, 129. The two containers form a narrow walled jacket while the propeller is turned by motor means 19, 119. The two containers may be cylindrical (13, 29) or conical (113, 129). If the slopes of the conical container form an angle with the horizontal greater than the angle of repose of the metallic granules which are treated, a matte will not form on the walls or bottom of the container.

While it will be apparent that the embodiments of the invention herein disclosed are well calculated to fulfill the objects of the invention, it will be appreciated that the invention is susceptible to modification, variation and change without departing from the proper scope or fair meaning of the subjoined claim.

I claim:

1. A method of recovering substantially impurity-free copper powder from chloride-containing copper powder, comprising the steps of treating the impurity containing powder with water in an elongated first enclosed zone of curvilinear cross-section having a large top opening and a small bottom aperture; propelling the water and powder slurry through said aperture into a second zone which closely surrounds said first zone so that said water and powder slurry rise along said first zone in said second zone, over said large top opening back into said first zone and recycling said slurry until the chlorides are dissolved in the water.

No references cited.

HYLAND BIZOT, *Primary Examiner.*

W. W. STALLARD, *Assistant Examiner.*